(12) United States Patent
Guerin et al.

(10) Patent No.: US 8,808,593 B2
(45) Date of Patent: Aug. 19, 2014

(54) CAP FOR THE NECK OF A CONTAINER AND METHOD FOR PRODUCING ONE SUCH CAP

(75) Inventors: Fabrice Guerin, Lyons (FR); Stéphane Iacopi, Saint Bernard (FR)

(73) Assignee: Tetra Laval Holdings & Finance S.A., Pully (CH)

( * ) Notice: Subject to any disclaimer, the term of this patent is extended or adjusted under 35 U.S.C. 154(b) by 1448 days.

(21) Appl. No.: 12/312,585

(22) PCT Filed: Nov. 19, 2007

(86) PCT No.: PCT/FR2007/001894
§ 371 (c)(1),
(2), (4) Date: Jan. 19, 2010

(87) PCT Pub. No.: WO2008/071860
PCT Pub. Date: Jun. 19, 2008

(65) Prior Publication Data
US 2010/0116774 A1 May 13, 2010

(30) Foreign Application Priority Data

Nov. 20, 2006 (FR) .................................. 06 10139

(51) Int. Cl.
*B29C 45/00* (2006.01)
(52) U.S. Cl.
USPC ..... 264/154; 264/318; 264/328.1; 264/328.3; 215/250; 215/251; 215/252; 215/253

(58) Field of Classification Search
USPC ............ 264/318, 154, 328.1, 328.3; 215/250, 215/251, 252, 253
See application file for complete search history.

(56) References Cited

U.S. PATENT DOCUMENTS

| 3,927,784 A | * | 12/1975 | Cochrane ...................... 215/256 |
| 4,796,771 A | | 1/1989 | Stettler |
| 4,856,665 A | * | 8/1989 | Dutt et al. ..................... 215/252 |
| 5,078,290 A | * | 1/1992 | Ochs ............................ 215/276 |
| 6,260,723 B1 | | 7/2001 | Bergholtz |
| 2001/0002014 A1 | | 5/2001 | Champagnon et al. |

FOREIGN PATENT DOCUMENTS

| GB | 2 164 028 | 3/1986 |
| WO | WO 2005/056413 | 6/2005 |

* cited by examiner

*Primary Examiner* — Timothy Kennedy
(74) *Attorney, Agent, or Firm* — Finnegan, Henderson, Farabow, Garrett & Dunner, LLP

(57) ABSTRACT

The invention relates to a cap for the neck of a container and to a method for producing one such cap. According to the invention, the skirt (12) of the cap (1) is provided with frangible bridge elements (44A, 44B) which break when the cap is first opened. In addition, on either side of the aforementioned frangible bridge elements, the skirt includes a non-removable part and a removable part provided with an outer biasing tab (24) that only extends along a peripheral portion (12A) of the skirt. In order to limit the biasing force of the tab, so as to release the removable skirt part, the radial dimension ($e_{44A}$) of the bridges (44A) located in the skirt portion (12) associated with the tab is smaller than the radial dimension ($e_{44B}$) of the bridges (44B) located outside said portion.

6 Claims, 5 Drawing Sheets

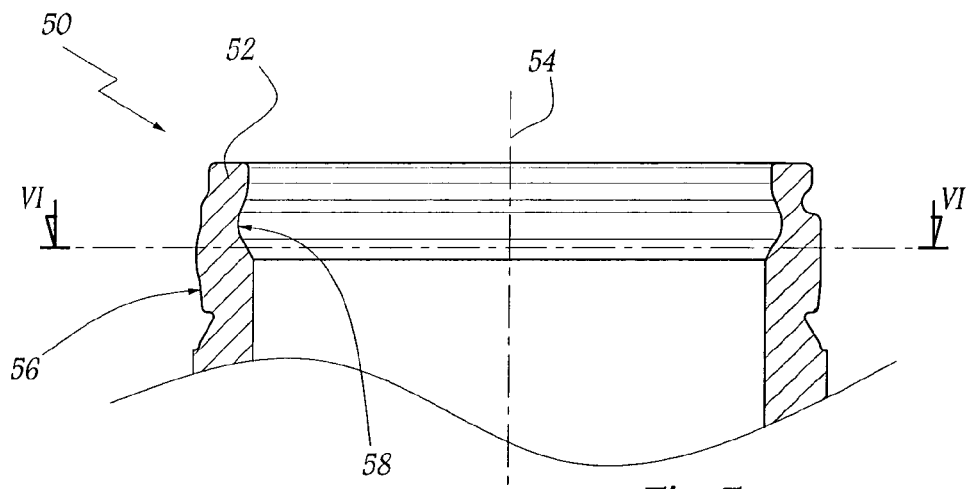
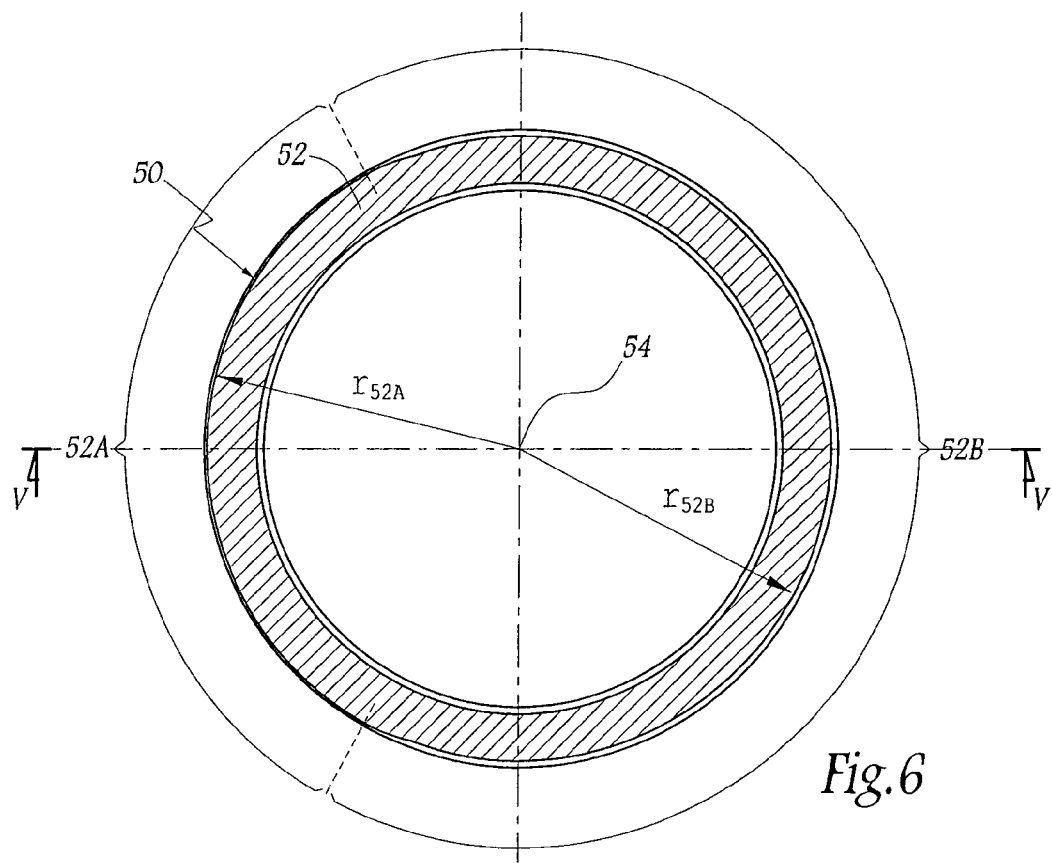

CAP FOR THE NECK OF A CONTAINER AND METHOD FOR PRODUCING ONE SUCH CAP

The present invention relates to a cap for the neck of a container and to a method for manufacturing such a cap.

The invention relates, in general, to caps comprising a skirt surrounding the neck of a container and of which a lower part, when considering that this neck rises up vertically with its mouth directed upward, is intended to remain around the neck after the cap is first opened, while the remainder of the skirt, that is to say the upper part thereof, is designed to be removable from the neck, while at the same time initially being connected to the non-removable lower part of the skirt by frangible bridges distributed around the periphery of the skirt and able to be broken as the cap is first opened. The line of weakness formed by these bridges serves to indicate this first opening, alerting users to the fact of this first opening.

The invention is aimed more specifically at caps of which the upper skirt part is equipped with an external tab allowing this skirt part to be moved clear of the non-removable lower skirt part through a manual action. Typically, this kind of tab extends over only a peripheral portion of the skirt, situated on that side of the cap that is intended to face toward the user, or in other words situated on what is generally known as the front side of the cap. In practice, when the user wishes to open the cap, he uses one of his fingers to apply an upwardly directed force to the tab, so as to move the upper skirt part clear of the neck and away from the lower skirt part. An example of this kind of cap is so-called "snap-on" caps, that is to say caps that can be clipped removably around the neck of the container, like the one disclosed in U.S. Pat. No. 6,260, 723.

When this kind of cap is first opened, the user has to develop a significant force in order to move the removable skirt part clear of the neck while at the same time breaking at least most of the bridges that initially connect this removable skirt part to the non-removable skirt part.

GB-A-2 164 028 discloses a molded cap of the abovementioned type, its particular feature being a line of weakness which, around the periphery of the cap, consists either of an uninterrupted thin wall or of a succession of bridges, except vertically below its operating tab, where there is an empty space devoid of any material. The presence of this empty space is put forward as being essential in that document, in so far as this space makes it possible to begin to tear the line of weakness at the time of first opening of the cap. Thus, when being opened for the first time, the cap does not offer the user any resistance initially, then offers a great deal of resistance to break either the aforementioned uninterrupted thin wall or the aforementioned bridges. The initial lack of resistance means that there is a risk that any inadvertent or accidental action on the tab may cause the cap to open, and weaken it, without the end-user being able to be aware of this because either the thin wall or the bridges will be almost intact. In other words, there are real risks that this cap can be sabotaged. Further, the presence of the empty space just in line with the tab presents cap-molding problems: in the absence of any connection between the upper and lower parts of the cap in line with the tab, the flow of material, particularly plastic, on either side of this empty space is more difficult to achieve. The mold used to manufacture the cap is therefore complicated, significantly limiting the cap layout options for cost reasons.

It is an object of the present invention to propose a cap of the abovementioned type, which is easier to open in the first instance, while at the same time limiting the risks that the removable skirt part can be separated from the non-removable skirt part without breaking along the line of the weakness.

To this end, a subject of the invention is a cap for a neck of a container as defined in claim 1.

In practice, the cap according to the invention is intended to be used in such a way that its tab lies on the side of the cap facing toward the user, or in other words on the side generally known as the front side of the cap. According to the invention, the front bridge or bridges are not as thick as the other bridges, particularly as the rear bridges. Thus, the force needed to break the front bridges is non-zero, thus limiting the risks of accidental opening and of sabotage of the cap, but this force remains modest, thus limiting the total force that the user has to produce in order to clear the removable skirt part away from the neck for the first time, for example to unclip it. Further, because the user has to operate the tab at the front of the cap in order to open the cap and because the resistance afforded by the bridges is lower at the front of the cap than for the remainder of the cap, the driving of the removable skirt part is somewhat guided from front to rear. Once the front bridges have been broken and the cap-opening movement has thus been initiated at the front of the cap, the user naturally continues to drive the removable skirt part with a view of gaining fuller access to the inside of the neck, causing the other bridges, particularly the lateral bridges then the rear bridges, to break.

In practice, the invention is aimed at front bridges the thickness of which is as small as possible, while at the same time acknowledging constraints associated with the material of which the skirt is made and associated with the molding of this skirt, in so far as this material can flow on either side of the line of weakness via the front bridge or bridges, amongst others. The effect whereby breakage of the front bridges takes precedence over the other bridges is, however, appreciable once the difference in thickness between the front bridges and the other bridges reaches at least 20%.

Advantageous features of the cap according to the invention, considered in isolation or in any technically feasible combination, are listed in dependent claims.

Other subjects of the invention are two methods of manufacturing a cap for the neck of a container.

These methods can be used to manufacture a cap as defined hereinabove.

The invention will be better understood upon reading the description which will follow, given solely by way of example and with reference to the drawings in which:

FIGS. 5 and 6 are longitudinal and transverse sections, respectively, of a molding insert used to manufacture the cap of FIG. 1, the planes of section of these figures being indicated by the lines V-V in FIG. 6 and VI-VI in FIG. 5, respectively;

FIGS. 1 to 4 depict a cap 1 that can be clipped removably onto the neck 2 of a container, the cap 1 generally being termed a "snap-on cap" or "snapped-on cap". In practice, the neck 2 is either formed as an integral part of the remainder of the container, particularly when the latter is a glass or plastic bottle, or designed to be permanently secured to a wall of the container, at an opening passing through this wall.

Figure 2:
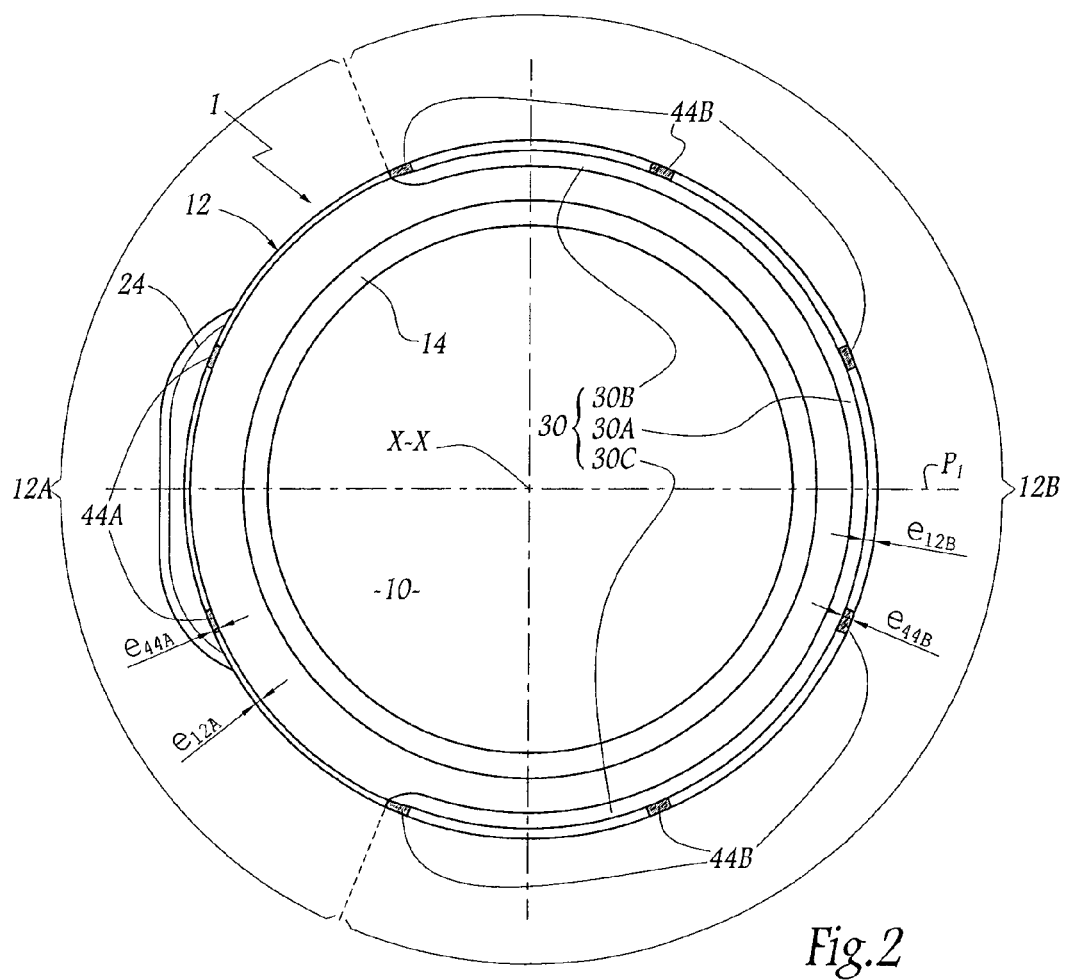
FIG. 2 is a section on the plane II-II of FIG. 1.
Figure 3:
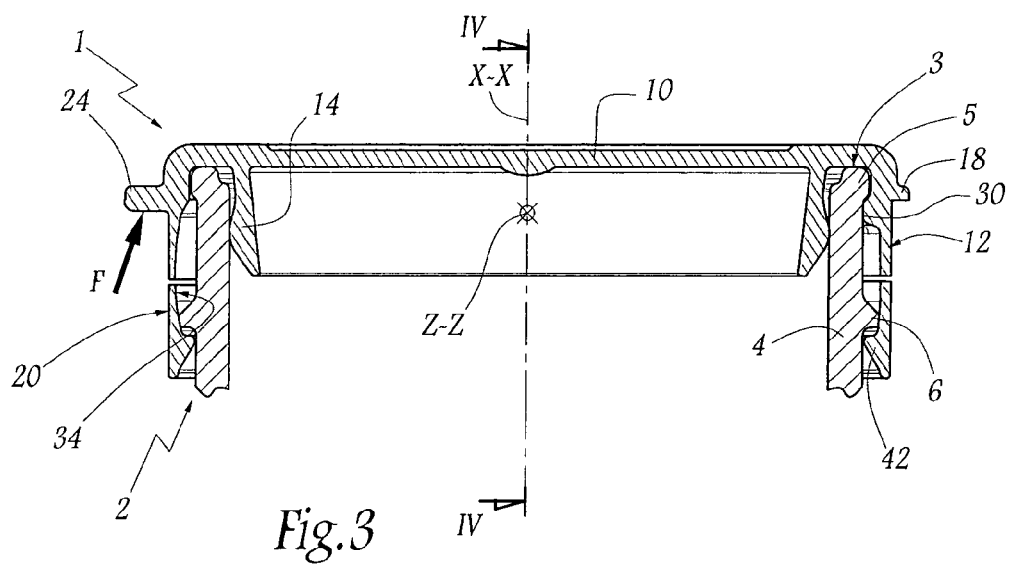
FIG. 3 is a view analogous to FIG. 1, in the same plane of section, after the cap has been fitted around the neck of a container.
Figure 4:
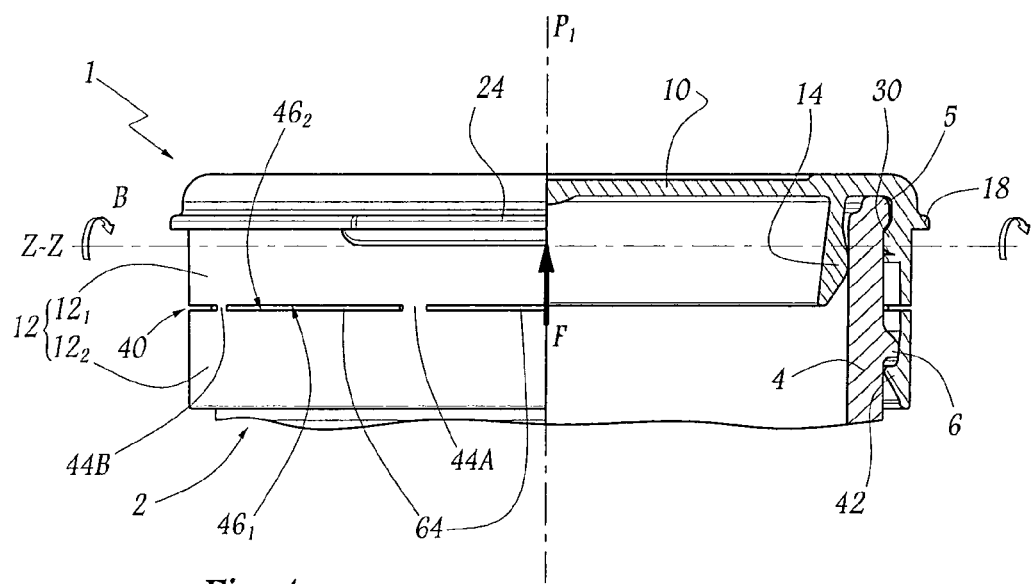
FIG. 4 is a view on IV-IV of FIG. 3, the left-hand part of FIG. 4 corresponding to an elevation while the right-hand part thereof corresponds to a section in the plane IV-IV.

The cap 1 and the neck 2 have globally tubular respective shape, the central longitudinal axes of which are substantially coincident, with the reference X-X, when the cap is clipped onto the neck, as in FIGS. 3 and 4. For convenience, the remainder of the description is considered on the basis that the terms "upper" and "top" correspond to a direction globally parallel to the axis X-X and extending from the body of the container toward its neck 2, that is to say in a direction directed toward the top part of all the figures except for FIG. 2, while the terms "lower" and "bottom" correspond to the opposite direction.

The neck 2 comprises a body 4 which is globally cylindrical on a circular base of axis X-X. At its top end, this body 4 delimits a mouth 3 from which the liquid contained in the container is intended to be poured. On the exterior face of the body 4, the neck 2 comprises, at its upper end, an edge 5 and, in its main part, a boss 6, this edge and this boss both extending radially out from the body.

The cap 1 is open at its lower end and closed at its upper end by an end wall 10, at the exterior periphery of which a tubular skirt 12, centered on the axis X-X, extends axially downwards. The cap also comprises a lip 14 which extends axially downward from the end wall 10, centered on the axis X-X, inside the external skirt 12. When the cap is clipped onto the neck 2 as in FIGS. 3 and 4, the end wall 10 extends over and across this neck, while the skirt 12 externally surrounds the body and the lip 14 is pressed hermetically against the interior face of this body.

At its upper end, the skirt 12 is equipped with an external peripheral flange 18 which externally forms the connection with the end wall 10. This flange extends radially outward relative to the tubular main wall of the skirt, of which the exterior surface, referenced 20, is cylindrical on a circular base, centered on the axis X-X. The flange 18 extends over the entire exterior periphery of the skirt 12, having an outwardly-protruding width that is constant around the periphery of the skirt, except over a narrow skirt portion 12A considered hereinafter to be the front side of the cap 1, this side being intended in use to face towards the user. This is because, at the front of the cap, which can be seen face-on in the left-hand part of FIG. 4, the skirt 12 is equipped, in its upper part, with an external tab 24 which projects radially outward from the surface 20, thus extending the front portion of the flange outward. In the advantageous form of embodiment envisioned in the figures, the tab 24 has a vertical plane of symmetry, denoted $P_1$ in FIGS. 2 and 4, and corresponding to the plane of section of FIGS. 1 and 3, it being pointed out that this plane $P_1$ is a longitudinal diametral plane of the skirt 12.

Likewise in its upper part, the skirt 12 is internally equipped with a clip 30 in the form of a bulge of material extending radially inward from the main wall of the skirt 12 and below which this wall of the skirt has a cylindrical interior surface 34 of axis X-X. The clip has a convex surface, which is connected to the end wall 10, thereby forming a recess to house the edge of the neck 2. As depicted in FIGS. 3 and 4, clipping the cap 1 in place consists in engaging this convex surface with the lower end of the edge 5, the latter then being housed in the aforementioned recess.

As can be seen in FIG. 2, the clip 30 is in the form of a clipping band, which extends around the interior periphery of the skirt, being interrupted at the front side of the cap. Thus, the clip 30 consists, on the one hand, of a rear portion 30A which extends on either side of the plane $P_1$ around the periphery of the skirt, and, on the other hand, two diametrically opposed lateral portions 30B and 30C which, around the periphery of the skirt, extend on either side of a longitudinal diametral plane perpendicular to the plane $P_1$, in this instance here advantageously being symmetric with respect to the plane $P_1$.

On the front side of the cap, the peripheral portion 12A of the skirt, which connects the respective front ends of the lateral portions of the clips 30B and 30C, and in the central part of which the tab 24 extends, is for its part devoid of any clipping means in so far as it is designed not to engage with the edge 5 of the neck 2 when the cap 1 is clipped on.

When the cap 1 is unclipped for the first time, the skirt 12 is designed to separate into two distinct parts, namely an upper part $12_1$, formed as an integral part with the end wall 10, and a lower part $12_2$ initially connected to the upper part $12_1$ at a line of weakness 40 situated axially in the main part of the skirt. The skirt part $12_1$ is intended to be moved completely clear of the neck 2 so that this part $12_1$ externally bears the tab 24 and internally bears the clip 30. The skirt part $12_2$ for its part is intended to remain around the neck 2. For this purpose, this part $12_2$ is internally equipped with a vane 42 projecting radially inward from the interior surface 34 of the skirt 12, extending around the entire periphery of the skirt. This vane extends axially under the boss 6 of the neck 2 and is designed to butt axially against this boss when the cap 1 is raised for the first time.

The line of weakness 40 comprises frangible bridges, eight of them in the example considered in the figures, distributed uniformly about the periphery of the skirt 12, in this instance advantageously symmetrically with respect to the plane $P_1$, so that, as depicted in FIG. 2, two of these bridges, referenced 44A, are situated in the front skirt portion 12A, while the other six bridges, referenced 44B, are situated outside of this portion 12A. At the line of weakness 40, the wall of the skirt 12 is interrupted between the bridges: as can be seen in FIGS. 1 and 4, the lower end edge $46_1$ of the skirt part $12_1$ is, between two successive bridges, axially distant from the upper end edge $46_2$ of the skirt part $12_2$, whereas at each of the bridges 44A and 44B, these end edges $46_1$ and $46_2$ are joined together in the direction of the axis X-X, by a continuation of material.

Figure 1:
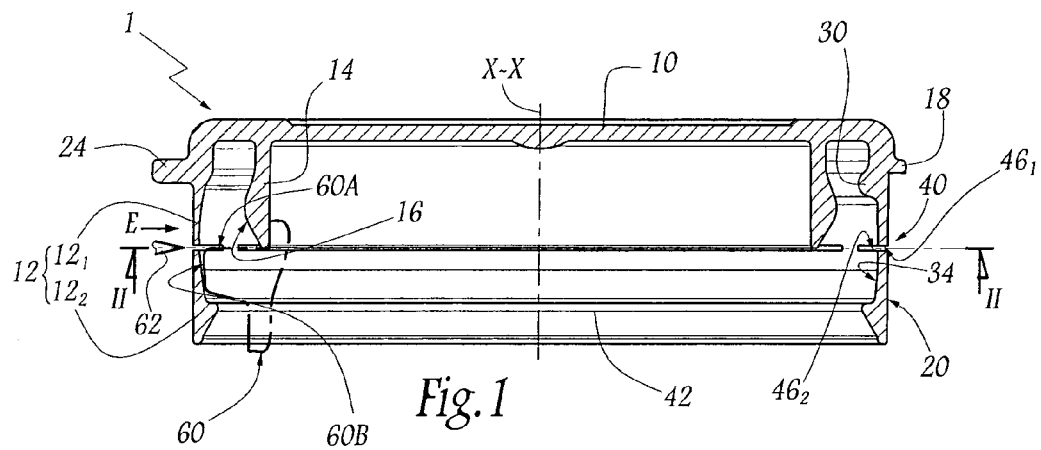
FIG. 1 is a longitudinal section through a cap according to the invention, depicted before it is fitted around the neck of a container.

As can be seen in FIGS. 1 and 2, the radial dimension, that is to say the thickness, of the wall of the skirt 12 varies around the periphery of the skirt, at the line of weakness 40. In its front portion 12A, the skirt has a substantially constant thickness $e_{12A}$ which is smaller than the thickness of $e_{12B}$ of the skirt portion 12B that constitutes the remainder of the skirt. Thus, because the thickness of each bridge is equal to the thickness of the end edges $46_1$ and $46_2$ that this bridge connects, the front bridges 44A have a thickness $e_{44A}$ equal to the thickness $e_{12A}$ and smaller than the thickness $e_{44B}$ of the bridges 44B, which is equal to the thickness $e_{12B}$.

To manufacture the cap 1, a semirigid plastic such as polypropylene or polyethylene is molded. This molding is intended to form, as a single piece, the end wall 10, the skirt 12 and the lip 14. The molding of this component is easy to achieve, even as far as the more radially protruding zone that the clip 30 constitutes is concerned because this zone does not extend over the entire periphery of the skirt, which means that the skirt retains a certain flexibility, particularly transversely. In particular, the use of three mold slides is not required.

In practice, use is advantageously made of a molding insert 50 depicted in FIGS. 5 and 6. This insert comprises a tubular body 52 of longitudinal central axis 54 the outer face 56 of which is configured to allow the interior face of the skirt 12 to be molded, and in particular to mold the clip 30 and the vane 42, while the interior face 58 of the body 52 is configured to allow the face of the lip 14 facing toward the skirt 12 to be molded. At the axial level of the body 52 that corresponds to the axial level at which the line of weakness 40 will be subsequently be formed, the body 52 has, in transverse section as in FIG. 6, an exterior peripheral contour which is not strictly circular but the radius of curvature of which varies: in the peripheral portion 52A of the body 52 designed to mold the front skirt portion 12A, this radius of curvature, referenced $r_{52A}$, is greater than the radius of curvature $r_{52B}$ of the portion 52B that constitutes the remainder of the body 52. By introducing the body 52 into a mold of strictly circular transverse section, centered on the axis 54, it will be understood that the skirt 12 is, at the aforementioned axial level of the body 52, molded with its front portion 12A less thick than the remainder of the skirt 12B, it being pointed out that the transverse contour of the interior surface 34 of the skirt is not strictly circular but corresponds to the aforementioned exterior contour of the body 52.

To release the cap 1 from the mold, use is advantageously made of the shoulder that marks the transition between the exterior surface 20 of the skirt and the flange 18, by applying an upward lifting force on this flange. By elastic deformation of material, the clip 30 is then easily released from the mold.

Having released the cap 1 from the mold, a mandrel 60, depicted in chain line only in the left-hand part of FIG. 1, is introduced axially into the cap from the bottom in order to create the line of weakness 40. This mandrel is advantageously introduced to such a point that its upper face 60A butts against the interior end of the lip 14, while its peripheral surface 60A bears against the underside 34 of the skirt 12.

A blade 62 is then used to make cuts 64, from the outside of the cap 1, through the wall of the skirt 12, the blade 62 being moved radially with respect to the axis X-X, as indicated by the arrow E, to pass right through the wall of the skirt. Advantageously, the blade 62 is applied just above the upper surface 60A of the mandrel 60, so that the cuts 64 are situated axially facing the lower end of the lip 14. In this way, the skirt part $12_2$ has a significant axial dimension by comparison with the skirt part $12_1$, namely of the same order of magnitude in the example considered in the figures, which means that the skirt part $12_2$ will act as an indicator that the cap 1 has been unclipped for the first time, which a user will readily spot. It will be appreciated that the fact that the cuts 64 can be cut facing the lower end of the lip 14 stems from the fact that, on the one hand, the skirt wall has, at this axial level, a modest thickness and that, on the other hand, this skirt has enough flexibility to allow the mandrel 60 to be introduced fairly high up inside the cap.

The blade 62 is moved in such a way as to cut the skirt 12 on its entire periphery, except at a succession of small portions distributed around the periphery of the skirt, where material remains to connect the skirt parts $12_1$ and $12_2$, thus forming the bridges 44A and 44B. To do this, the blade 62 has a fluted profile and/or is manipulated appropriately relative to the skirt.

The cutting operation performed using the blade 62 is designed to yield the desired angular positioning of the front bridges 44A and of the other bridges 44B. Furthermore, given the fact that the main wall of the skirt 12 has been molded using the insert 50 and the fact the cutting actions are exclusively radial with respect to this wall, it will be understood that the various bridges 44A and 44B are situated radially between the exterior 20 and interior 34 surfaces of the skirt wall, that is to say to take account of the interruption of material between the skirt parts $12_1$ and $12_2$ at the cut 64 between, on the one hand, the enveloped delimited by the exterior surfaces of the skirts parts $12_1$ and $12_2$ and, on the other hand, the envelope delimited by the interior surfaces of the skirt parts $12_1$ and $12_2$.

The cap 1 can then be fitted around the neck 2. To unclip this cap, the user acts on the underside of the tab 24, attempting to lift this tab upward. In practice, the user uses at least one of his digits to apply a force F in a direction parallel to the axis X-X or, more often, at a slight angle to this axis, as indicated in FIGS. 3 and 4. In so far as the front skirt portion 12A does not interfere with the edge 5 of the neck 2, because the front surface of this portion 12A is radially distant from the edge 5, applying the thrusting force F causes the front portion 12A to be lifted up relative to the remainder of the skirt 12B, through the elasticity of the skirt. In practice, the skirt is thus flexible enough at the front over an angular sector of the portion 12A measuring at least 90°. The front portion of the vane 42 can therefore butt against the corresponding portion of the boss 6 of the neck 2, so that the front bridges 44A, unlike the other bridges 44B, experience a significant force that tends to break them. Because these front bridges 44A are not as thick as the other bridges 44B, they break swiftly, that is to say without the user having to develop a very intense force F.

Advantageously, the lifting of the front portion 12A of the skirt 12 is guided by the clip 30. Specifically, the lateral clip portions 30B and 30C thus form, through collaboration with the edge 5, pivots articulating this skirt portion 12A with respect to the remainder of the skirt 12B: the imaginary line Z-Z diametrically connecting the clip portions 30B and 30C constitutes, from a dynamic standpoint, an axis of pivoting of the skirt portion 12A with respect to the neck 2, as indicated by the arrow B in FIGS. 3 and 4.

By continuing to apply the thrust force F, the user progressively deforms the entire front side of the cap until the lateral clip portions 30B and 30C are forced to disengage: the rear clip portion 30A then acts as the articulation, by collaboration of its convex surface with the lower end of the edge 5, these sliding one against the other in an overall pivoting movement about an imaginary axis substantially parallel to the axis Z-Z and extending on the rear side of the cap. The rear clip portion 30A thus stabilizes the disengagement of the lateral clip portions 30B and 30C until these portions have been brought above the edge 5, the cap then being in a configuration that will allow the rear clip portion 30A to be disengaged transversely from the edge 5.

Figure 7:
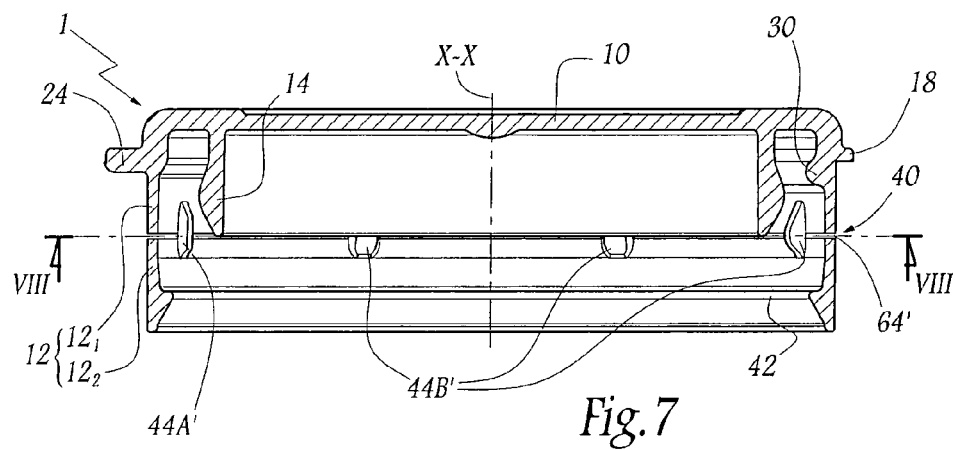
FIG. 7 is a view analogous to FIG. 1, illustrating a second embodiment of a cap according to the invention.
Figure 8:
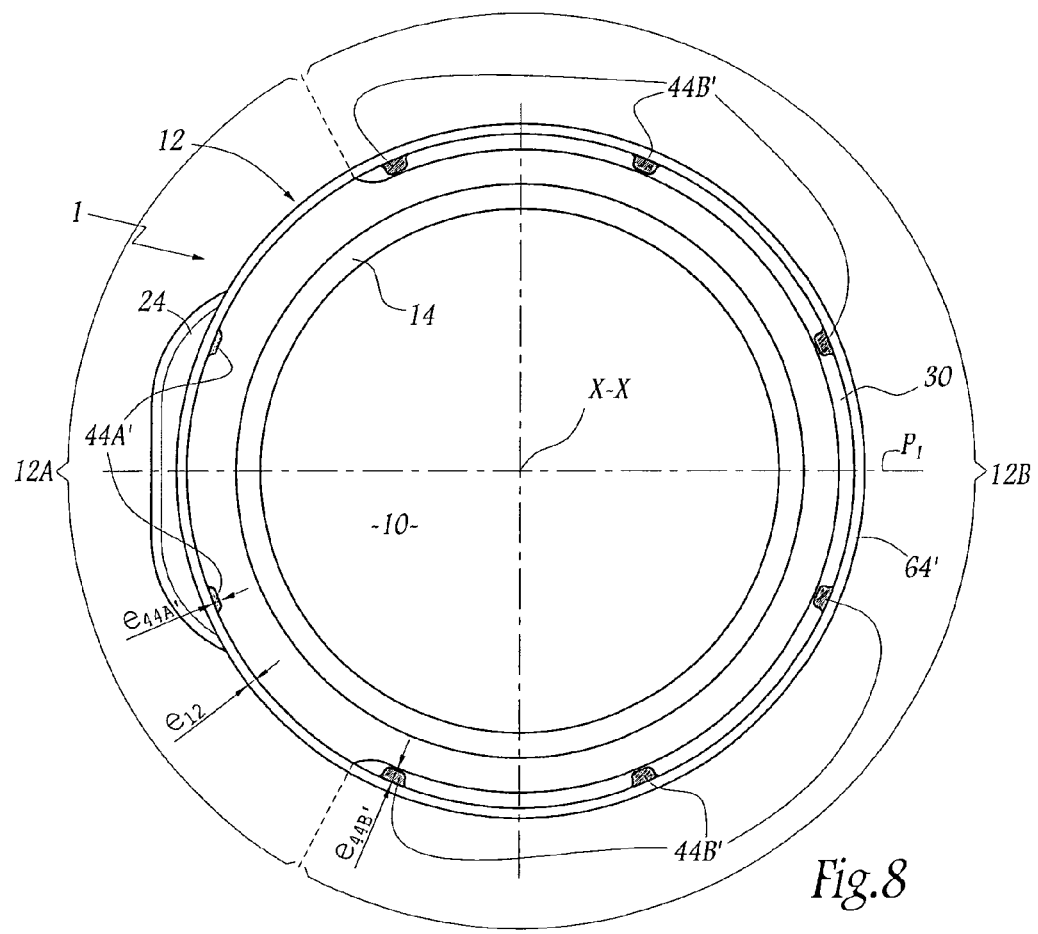
FIG. 8 is a section on VIII-VIII of FIG. 7.

FIGS. 7 and 8 depict an alternative form of embodiment of the cap 1, of which components common to the cap of FIGS. 1 to 4 through convenience bear the same references. This alternative form differs from the embodiment of FIGS. 1 to 4 in the structure of the frangible bridges of the line of weakness 40. Specifically here, unlike the bridges 44A and 44B connecting the end edges $46_1$ and $46_2$ of the skirt parts $12_1$ and $12_2$ in the straight continuation of these skirt parts along the vertical, the bridges 44A' and 44B' of this alternative form connect the interior surfaces of the skirt parts 12A and 12B from inside the skirt 12. To do this, these bridges 44A' and 44B' are, along the axis X-X, longer than the axial spacing between the opposing end edges $46_1$ and $46_2$, the longitudinal ends of each of these bridges projecting radially inward relative to the interior surfaces of the skirt parts $12_1$ and $12_2$. Of course, to limit the strength of force needed to break the front bridges 44A' by comparison with that needed to break the rear bridges 44B', the thickness $e_{44A'}$ of the front bridges is smaller than the thickness $e_{44B'}$ of the rear bridges.

Figure 9:
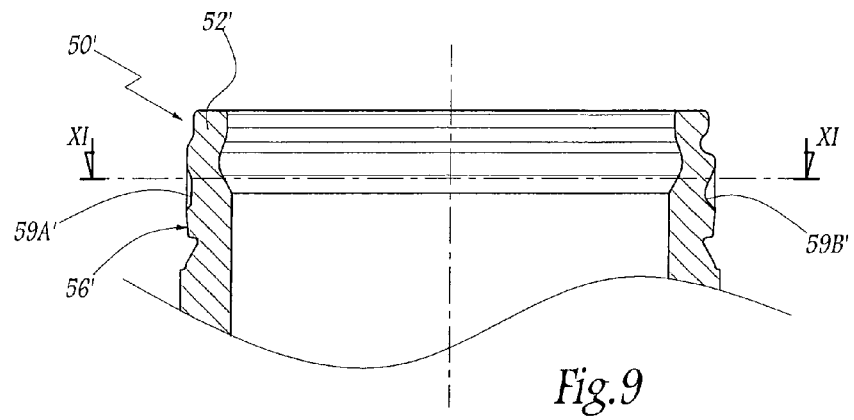
FIGS. 9 and 10 are a longitudinal and transverse section, respectively, of a molding insert used to manufacture the cap of FIG. 7, the planes of section of these figures being indicated by the lines IX-IX in FIG. 10 and XI-XI in FIG. 9, respectively.
Figure 10:
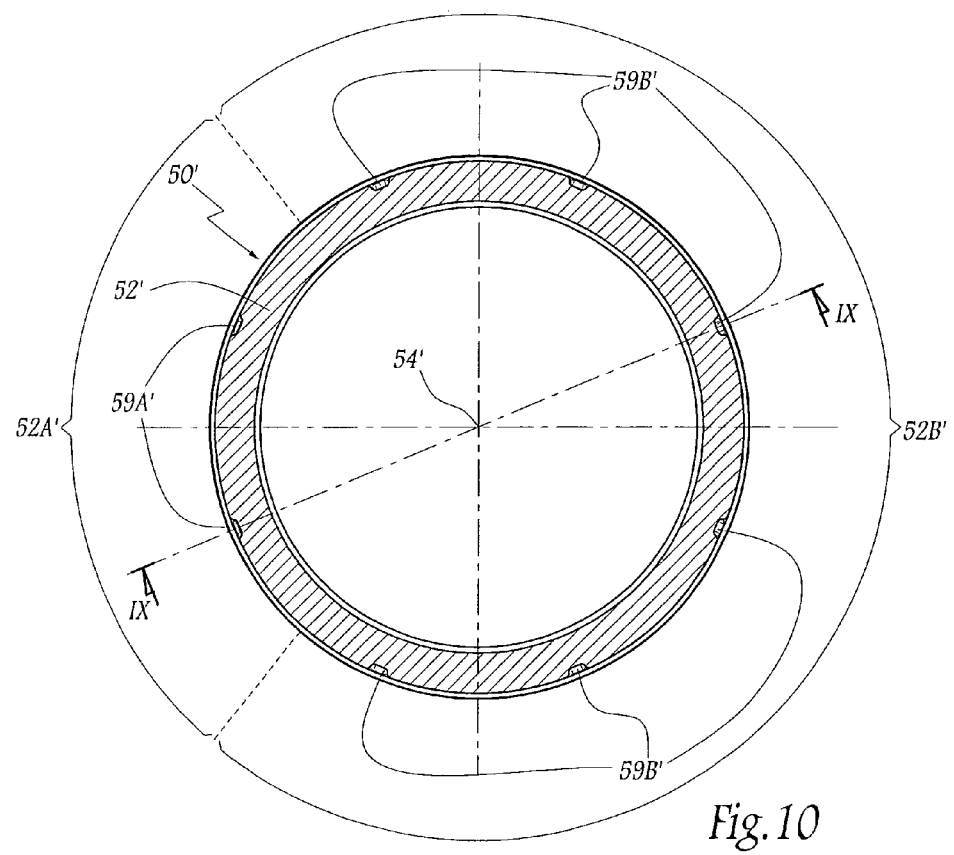

To manufacture this alternative form of cap 1, use is preferably made of the insert 50' depicted in FIGS. 9 and 10. This insert 50' differs from the insert 50 of FIGS. 5 and 6 in that, at the axial level of its tubular body 52' that corresponds to the axial level at which the line of weakness 40 will subsequently be formed, on the one hand, the exterior profile of its transverse section is strictly circular and, on the other hand, its exterior face 56' has cavities distributed around the periphery of the body 52'. In the front portion 52A' of the body 52', the cavities, referenced 59A', are radially not as deep as the cavities 59B' of the remainder 52B' of this body, which means that when the skirt 12 is molded, the cavities 59A' mold bulges that are not as thick as the bulges molded by the cavity 59B'. Further, it will be appreciated that use of the insert 50' makes it possible to mold the skirt 12 with a wall thickness $e_{12}$ that is constant about its periphery, at the axial level corresponding to the level at which the line of weakness 40 will be formed.

Following mold release, in order to obtain this line of weakness 40, a single cut 64' right through the main wall of skirt is made around the entire periphery of the skirt 12. To do this, use is made in particular of a cutting blade applied radially to the skirt 12, from the outside of this skirt. The cutting operation is designed not to cut the bulges of material molded by the cavities 59A' and 59B', which means that these bulges then form the frangible bridges 44A' and 44B'. The line of weakness 40 is thus easier to achieve than that of the caps of FIGS. 1 to 4 because the cutting blade, or similar cutting equipment, does not have to be manipulated in elaborate movements and/or does not need to have a fluted interior profile.

Various modifications and variations to the two embodiments of the cap 1 described hereinabove are also conceivable. By way of example:

- in addition to having a smaller thickness than the bridges 44B or 44B', the front bridges 44A or 44A' may have a smaller peripheral dimension than the bridges 44B or 44B', thus enhancing the effect of priority rupture for the front bridges by comparison with the other bridges; to achieve this, the blade 62 is moved appropriately relative to the skirt 12, around its periphery, during the operations of making the cuts 64 or, alternatively, the cavities 59A' have a smaller peripheral dimension than the other cavities 59B' of the insert 50';
- the number of bridges is not restricted to eight, as in the examples considered in the figures; this number may be higher or lower provided, firstly, that there is at least one bridge in the front skirt portion 12A and, secondly, thus there is at least one other bridge situated outside of this portion; and/or
- the means of removably attaching the skirt part $12_1$ to the neck 2 may have forms other than the clip 30; for example, a clip extending over the entire interior periphery of the skirt may be provided or, alternatively, rather than imagining clip fastening, the skirt part $12_1$ may be immobilized removably relative to the neck 2 by a base permanently attached around the neck 2, it being pointed out that these various conceivable means of removable attachment have to be designed to be operated by means of the tab 24, allowing the cap to be brought clear of the neck by deforming the front side of this cap relative to the remainder of the cap.

The invention claimed is:

1. A method of manufacturing a cap for a neck of a container, wherein an elongate tubular skirt, able to surround the neck and equipped both with means of returning it around the neck and with an external operating tab extending over just a peripheral portion of the skirt and allowing the cap to be opened, is molded, wherein, at least at one longitudinal level of the skirt, the wall of the skirt is molded circumferentially around the skirt in such a way that the radial dimension of its peripheral portion associated with the tab is smaller than the radial dimension of the remainder of the skirt, and wherein, at said longitudinal level of the skirt, cuts are then made through the wall of the skirt so as to delimit, around the periphery of the skirt, frangible bridges of which at least one is situated in the peripheral portion of the skirt associated with the tab while at least one other of the bridges is situated outside of this portion, which bridges, before the cap is first opened, connect a non-removable skirt part equipped with the retaining means to a removable skirt part equipped with the tab.

2. The method as claimed in claim 1, wherein, when the skirt is being molded, use is made of a molding insert of which a portion used to mold the peripheral portion of the skirt associated with the tab delimits, in a transverse plane of section corresponding to said longitudinal level of the skirt, an exterior peripheral contour which exhibits a radius of curvature greater than the radius of curvature of the remainder of the insert.

3. A method of manufacturing a cap for the neck of a container, wherein an elongate tubular skirt, able to surround the neck and equipped both with means of returning it around the neck and with an external operating tab extending over just a peripheral portion of the skirt and allowing the cap to be opened, is molded, wherein, at least at one longitudinal level of the skirt, bulges projecting radially inward from the wall of the skirt are molded together with the skirt such that the radial dimension of at least one of the bulges situated in the peripheral portion of the skirt associated with the tab is smaller than the radial dimension of at least one other of the bulges situated outside of this portion, and wherein, at said longitudinal level of the skirt, a single cut which passes right through the wall of the skirt is then made over substantially the entire periphery of the skirt, from an interior face of the skirt to an outside face of the skirt, the bulges projecting radially inward from the interior face of the skirt, without cutting through the bulges, so that these bulges form frangible bridges connecting a non-removable skirt part equipped with the retaining means to a removable skirt part equipped with the tab before the cap is first opened.

4. The method as claimed in claim 3, wherein, when molding the skirt, use is made of a molding insert which, at the level corresponding to said longitudinal level of the skirt, delimits on the exterior surface bulge-molding cavities, the radial depth of the cavity or cavities situated in the portion of the insert used for molding the peripheral portion of the skirt associated with the tab being smaller than the radial depth of the cavity or cavities situated in the remainder of the insert.

5. The method as claimed in claim 1, wherein the cap comprises a lip inside the skirt to seal against an interior of the neck.

6. The method as claimed in claim 3, wherein the cap comprises a lip inside the skirt to seal against an interior of the neck.

* * * * *